Dec. 13, 1960 E. N. SHAWHAN 2,963,908
APPARATUS FOR IMPEDANCE MEASUREMENTS
Filed April 19, 1955 3 Sheets-Sheet 1

INVENTOR.
ELBERT NEIL SHAWHAN
BY
ATTORNEYS

INVENTOR.
ELBERT NEIL SHAWHAN

Dec. 13, 1960  E. N. SHAWHAN  2,963,908
APPARATUS FOR IMPEDANCE MEASUREMENTS
Filed April 19, 1955  3 Sheets-Sheet 3

INVENTOR.
ELBERT NEIL SHAWHAN
BY
ATTORNEYS

_United States Patent Office_

2,963,908
Patented Dec. 13, 1960

2,963,908

APPARATUS FOR IMPEDANCE MEASUREMENTS

Elbert Neil Shawhan, Newtown Square, Pa., assignor to Sun Oil Company, Philadelphia, Pa., a corporation of New Jersey Filed Apr. 19, 1955, Ser. No. 502,445

12 Claims. (Cl. 73—304)

This invention relates to methods and apparatus for impedance measurements and has particular reference to the making of such measurements to a high degree of accuracy over extended ranges.

In my application Serial No. 449,437, filed August 12, 1954, there are disclosed various types of apparatus for the making of impedance measurements. The present invention has as its general object the improvement of the methods and apparatus disclosed in said application, with particular reference to the improvement of measurements of liquid or other bed levels, though the present invention is not limited thereto as will be apparent hereafter.

As pointed out in said prior application, liquid or other bed levels may be measured by measurements of capacitances to which they give rise, and these measurements may be carried out in such fashion as to be substantially independent of remote connecting means or other factors involved which ordinarily give rise to inaccuracies. Such apparatus is capable of measuring capacitances, and, therefore, levels, to an accuracy which is a small percentage of the total range of capacitance involved, but there are situations in which the requirements for accuracy of measurement are such as to require measurements over extended ranges to be accurate within very small percentages of the total range.

Such problems arise, for example, in the measurement of liquid levels in large tanks. For example, in the storage of petroleum products there are used large tanks which may commonly involve changes in liquid level of twenty or more feet. Measurements may well be desired to an accuracy of one-eighth inch. Accordingly, the requirements involve measurements to an accuracy of about 0.05% throughout the full range. It will be evident that limitations on the range of operation of electronic devices and on the accuracies of indicating meters, etc., would render practically impossible of attainment accuracies of the order mentioned if, for example, a capacitance having its minimum value at the lowermost level of the liquid and its maximum value at the highest level of the liquid were to be measured. Even utilizing null systems involving the comparison of the capacitance to be measured against a precision variable capacitance, such accuracies are not practically attainable without the exercise of the utmost precautions in the maintenance of calibration of the standard capacitance, and commercial practicability as against laboratory measurement is unattainable.

In accordance with the present invention, there is provision for the measurement of capacitances or other impedances to accuracies which are substantially independent of the extent of a complete large range of measurement. In accordance with the invention, the complete range is subdivided into sub-ranges in each of which measurements may be made to an accuracy of the order of 1% or better of the sub-range. Such measurements to an accuracy of 1% are commercially practical. Despite such subdivision of a large range, the measurements may be made continuous throughout the complete range.

In the capacitance measurement of liquid or bed levels wherein the material provides the dielectric, a source of considerable error may be variation of the dielectric constant with temperature or composition, such variation giving spurious level indications. As will appear, the present invention makes possible the practical elimination of errors due to dielectric constant variations.

The foregoing matters will be better understood from consideration of the following detailed description from which there will be evident the attainment of other objects of the invention relating to details of construction and operation and also the broader possibilities of utilizing the invention. A preferred form of apparatus is shown in the accompanying drawings, in which.

Figure 1:
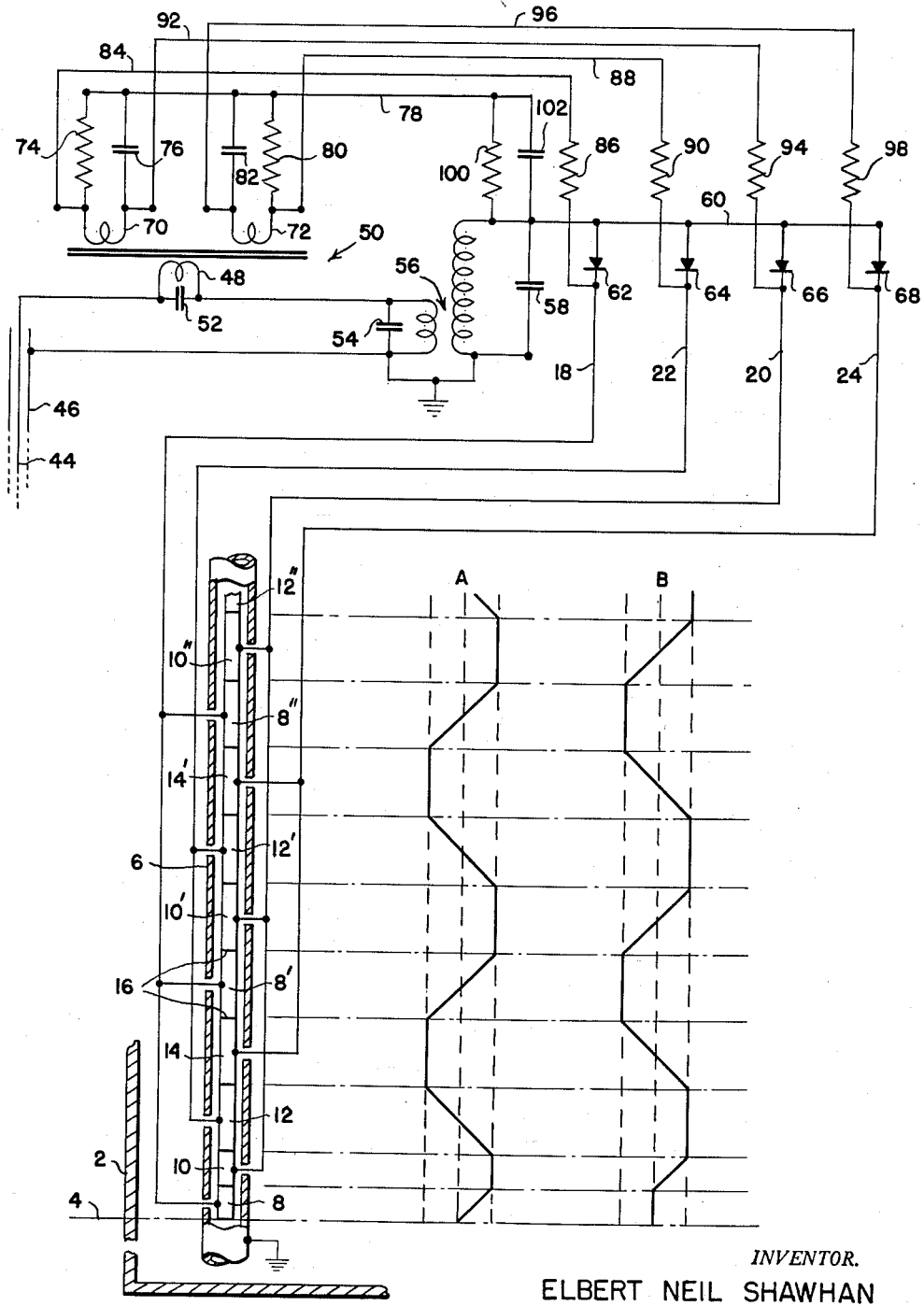
Figure 1 is a diagram showing portions of the apparatus associated with a tank in which liquid levels are to be measured, this figure additionally showing diagrammatically curves illustrative of capacitance differences involved in the measurements.

In Figure 1 there is indicated at 2 a tank which may be assumed to contain a hydrocarbon liquid the level of which is to be measured, the minimum level at which measurement is desired being indicated at 4. Extending vertically within the tank 2 there is a conducting metallic tube 6 which is electrically grounded. This tube is continuous except for small openings for the passage of leads. For the sake of consistency in description, it will be assumed that above the level 4 there are units of subdivision measuring one foot each. It will be apparent that these units may have other values of length, but the assumption is consistent with the idea that, if within each foot measurements may be made to an accuracy of a hundredth of a foot, this will correspond to level measurements of an accuracy of approximately one-eighth inch. Extending along the central axis of the tube 6 are a series of conductors insulated from each other which may conveniently be provided by lengths of metallic tubing having an outside diameter less than the inside diameter of tube 6. Insulation may be provided by plugs joining the ends of the tubes and providing separation of their adjacent ends. As will become apparent, capacitances are provided between these various tube segments and the ground plate provided by the tube 6, the hydrocarbon liquid providing a dielectric. Since the dielectric constant of the liquid is substantially higher than that of air, a capacitance increase occurs between any tube segment and the tube 6 when the space therebetween is flooded with the liquid in the tank.

The lowermost conducting segment indicated at 8 has a length of one foot above the level 4. The next segment 10 also has a length of one foot. Above this are the successive segments 12 and 14 each having a length of two feet. The next groups of segments 8′, 10′, 12′ and 14′ have lengths of two feet each. This arrangement is then repeated as at 8″, 10″, 12″, etc., up to and past the highest level of liquid which is to be measured. The vertical separations afforded by the insulation 16 are negligible in comparison with the segment lengths and may be disregarded. High voltages are not involved and, accordingly, separations of the segments may be of the order of a hundredth of an inch.

The segments 8, 8', 8", etc., are connected to each other and to a lead 18 by connections extending through openings in the tube 6 and insulated therefrom. In similar fashion, segments 10, 10', 10", etc., are connected to a lead 20, segments 12, 12', 12", etc., are connected to a lead 22, and segments 14, 14', etc., are connected to a lead 24. To indicate the nature of the measuring system involved, consideration may be given to the graphs illustrated at A and B. The former represents the variation with liquid level of the difference of the capacitances to ground appearing at the leads 18 and 22. Graph B similarly indicates the differences in the capacitances to ground appearing at the leads 20 and 24. These differences, considered always in the same senses, may obviously be negative or positive. Assuming, first, that the liquid is at the level 4, it will be evident that the capacitance appearing at lead 18 is equal to the capacitance appearing at lead 22 (using a trimming adjustment, not shown, to balance capacitances of the leads and to correct for the half-length construction of segment 8) so that the difference is zero. Similarly, the difference between the capacitances appearing at leads 20 and 24 may be made initially zero. As the level now rises to submerge more and more of the segment 8, the capacitance appearing at lead 18 will correspondingly exceed that appearing at lead 22 until the liquid level reaches the level of junction of the segments 8 and 10. The last mentioned rise of liquid level, however, does not change the capacitances appearing at leads 20 and 24 and, accordingly, their difference remains zero as indicated by graph B. If the liquid level rises still further, submerging more and more the segment 10, the capacitance appearing at lead 20 correspondingly exceeds the capacitance appearing at lead 24 as indicated in the graph B, the difference reaching a positive maximum at the two foot level corresponding to the upper end of segment 10. During the last mentioned rise of the liquid, the relationship between the capacitances appearing at leads 18 and 22 is unaltered, remaining at the maximum positive value as indicated in graph A.

As the liquid level rises through the length of the segment 12, the capacitance appearing at lead 22 increases while that appearing at the lead 18 remains constant. The difference of the capacitances represented by graph A accordingly then changes from a maximum positive value through zero to a maximum negative value when the liquid level reaches the upper end of the segment 12. During this last mentioned liquid rise, the capacitances appearing at leads 20 and 24 are not affected, with the result that their difference indicated in graph B remains at the positive maximum value. By similarly following the conditions which occur as the liquid level continues to rise, it will be noted that the capacity differences vary as illustrated in the graphs A and B, there being a variation of one while the other remains constant and then a variation of the latter while the former remains constant, the variations alternately being from maximum positive to maximum negative values and then from maximum negative to maximum positive values in the case of each pair of conductors.

It will now be evident that if capacity differences are subject to measurement with suitable switchings of the measurements, the maximum capacitance differences which are required to be measured are between zero and either the positive or negative maximum values of these differences. The full range of a capacity difference occurs in the vertical change of liquid level of one foot, and if the capacity difference may be measured to an accuracy of 1% there would thus be attained a measurement of liquid level to an accuracy of approximately one-eighth inch. As will appear hereafter, the particular one foot level range in which measurements are being made may be indicated so that the liquid level throughout its complete range of variation may be determined without ambiguity to an accuracy of one-eighth inch. It will be evident from what has just been discussed that the accuracy of measurement is substantially independent of the extent of the range and, if required, substantial accuracy of measurement could be maintained throughout a complete range of liquid level variation which might even be hundreds of feet. The primary limitation on accuracy over large ranges is due to the fact that the capacity differences measured become, as the range increases, differences between large capacitances subject to some drifts in their values due to stresses, temperature changes or the like. However, as will be evident, the capacitances involved are similarly subjected to disturbing influences and therefore the effects of these are minimized.

Before indicating how the measurements are desirably made, there may be discussed variations of what has been specifically described. In the event that the liquid is a non-conducting dielectric, the arrangement illustrated may be used, the liquid providing the dielectric for the capacitances involved. If the liquid is a conductor such as an aqueous liquid, the modification of the system required will be evident, the liquid itself then being used as a grounded plate of the capacitances involved, the segments 8, 10, 12, etc., then taking the form of conductive segments coated with an insulating dielectric of uniform thickness such as Teflon, or the like, unaffected by the liquid undergoing measurement. In this fashion, for example, corrosive aqueous liquids may have their levels readily measured.

Furthermore, the levels of liquids are not alone measurable by the system described. If the tube 6 is provided with lengthwise slots and is sufficiently spaced from the interior conducting segments, solid beds of pulverized materials may have their levels measured, the material entering the space between a tube corresponding to 6 and the array of segmental conductors to provide dielectric variation giving rise to the capacity differences previously discussed. Here again, depending upon whether the solid material is of insulating nature or conducting (for example, if it is wet), the material may constitute either the dielectric or the ground plate of a series of capacitances, the segmented conductor in such case being coated with a uniform insulating material. The particular physical arrangement of the elements constituting the condenser plates is, of course, subject to variation, flat plate arrangements being usable, if desired, to provide for ready entrance and exit between them of material which may tend to flow with difficulty.

In some cases, furthermore, it may not be desirable to introduce between the conductive elements providing the capacitances materials which would tend to adhere or provide permanent deposits which might affect the accuracy of measurements over an extended period of time. In such case, a manometer arrangement may be provided exterior to the tank containing the material undergoing measurement, there being provided within the tank a chamber having bellows-like or other flexible walls exposed exteriorly to the material undergoing measurement and containing interiorly a clean liquid, either a conductor or a dielectric, communicating through a pipe to an arrangement such as that shown, or a suitable alternative, so that the clean liquid will by its variations of level provide the capacitance variations for measurement. In such case, the changes of capacitance will be proportional to pressure within the tank which will constitute a measurement of the quantity of material within the tank.

If quantity rather than level is to be measured, furthermore, in a tank which is not cylindrical, then either an arrangement such as illustrated in Figure 1 within the tank or a manometer arrangement exterior to the tank may be suitably contoured, for example by corresponding variations in diameters of the tube 6 or of the conducting segments to give direct readings taking into account the variations in horizontal cross-section of the tank. In such case, of course, the vertical extents of the conducting segments may vary.

The principles involved are adapted to a great variety of measurements other than those of liquid level or pressure resulting from variation of liquid level as discussed above. The manometer arrangement which has been mentioned may obviously be used for the measurement of pressures or forces. Mechanical displacements, either straightline or rotary, may also obviously be measured in accordance with the principles outlined by providing that such displacements vary sets of capacitances by relative movement of suitable condenser plates. In all of such applications of the invention, what may be involved is the measurement of large ranges of variables to accuracies which may be extremely small percentages of the total range. In each case, this is accomplished by limiting the actual capacitance measurement to small ranges which correspond to segments of the complete range, there being readily possible through direct reading instruments, such as described hereafter, measurements to an accuracy of 1% of a sub-range, while with null reading arrangements involving comparison with precision capacitances or other elements the accuracy percentagewise of the sub-range may be still further improved. It is to be understood, therefore, that the invention is not to be regarded as limited to what has been or will be specifically described.

Figure 2:
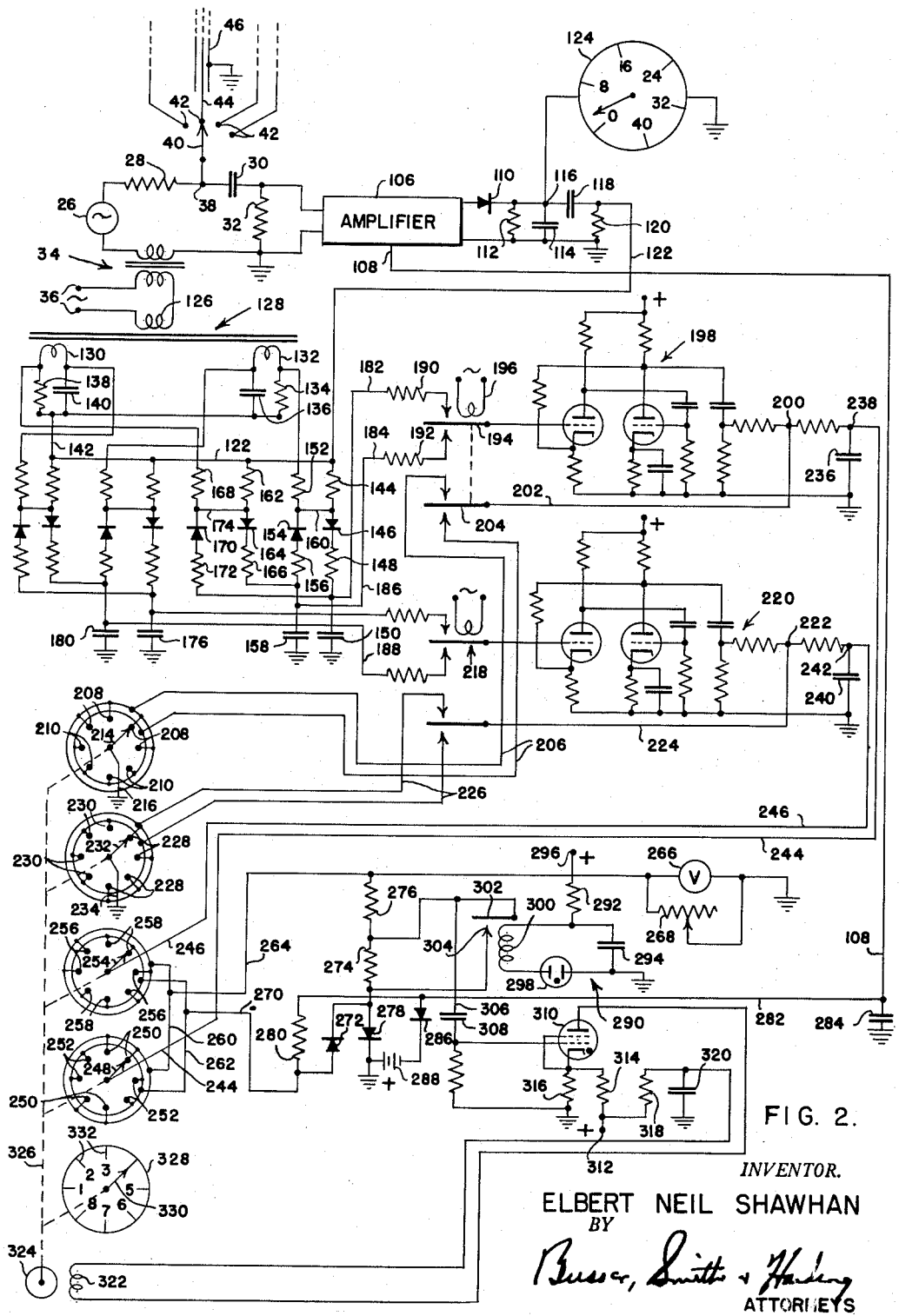
Figure 2 is a wiring and mechanical diagram showing apparatus which may be located at a central station for the measurement of liquid levels in a large number of tanks.

Reference may now be made to the preferred form of apparatus which is illustrated in the drawings in association with the capacitance-providing arrangement shown in Figure 1. Reference may be first made to Figure 2 which shows those elements of a complete apparatus which may be located at a central control or reading station at which readings may be obtained of the indications of a very large number of remotely located liquid levels.

There is indicated at 26 a generator of oscillations which may take the form of any suitable oscillator, for example, as described in my prior application referred to above. The output from this source of oscillations may, for example, be at a frequency of about 10 kilocycles per second, though, as will be evident, the frequency used is by no means critical and may be chosen to suit the particular installation involved. If the capacitances involved in measurement are fairly large, lower frequencies may be used, while if the capacitances are small it may be desirable to use quite high frequencies. The output from the source 26 is fed to the series arrangement of a resistor 28, a capacitor 30, a resistor 32, and the secondary of a transformer 34 the primary of which is energized from terminals 36 which may supply the transformer with commercial alternating current at a frequency of 60 cycles per second or some other frequency which is small as compared with the frequency supplied by source 26. The frequency supplied at terminals 36 will be referred to as the switching frequency for reasons which will become obvious.

The junction 38 between resistor 28 and capacitor 30 is connected to a switch 40 which is arranged to selectively engage contact points 42. These contact points 42 may be of quite large number in which case the switching arrangement may be of more elaborate form such as commonly used in the electrical arts. Each of the points 42 corresponds to a remote pickup unit and is connected thereto through a coaxial cable comprising the central conductor 44 and grounded sheath 46. Each such connection is to a pickup apparatus such as shown in Figure 1.

The coaxial cable feeds in series the primary 48 of a transformer 50 and the primary of a transformer 56, the former primary being shunted by a condenser 52 and the latter by a condenser 54. The condenser 52 is of low capacity and serves for the bypass of the relatively high signal frequency past the primary 48. The condenser 54 serves to tune the entire circuit to approximately resonance at the signal frequency. The secondary of transformer 56 is also tuned to approximate resonance at the signal frequency by the capacitance 58.

One of the terminals of the secondary of transformer 56 is grounded while the other is connected to a line 60 to which are connected the anodes of respective diodes 62, 64, 66 and 68, the cathodes of which are connected to the lines 18, 20, 22 and 24 previously discussed.

Transformer 50 is provided with a pair of secondaries 70 and 72. The former is connected in series with a resistor 74 and a capacitor 76. The latter is connected in series with a resistor 80 and a capacitor 82. The connections are such that the potentials applied simultaneously to the resistors 74 and 80 are 180° out of phase, the same, of course, being true of the potentials applied to the capacitors 76 and 82. The junctions between the resistors and capacitors are connected to a common line 78. Between line 78 and line 60 there is provided the capacitor 102 shunted by the resistance 100. By reason of this arrangement, and the rectifying actions of the diodes 62, 64, 66 and 68, the signals at signal frequency give rise to a negative bias applied to the anodes of the diodes and rendering them normally non-conductive.

The input terminal to resistor 74 is connected at 84 to the cathode of diode 62 through a resistor 86. In similar fashion, the input terminal to resistor 80 is connected at 88 to the cathode of diode 64 through resistor 90. The input terminal to condenser 76 is connected at 92 to the cathode of diode 66 through resistor 94. The input terminal to condenser 82 is connected at 96 to the cathode of diode 68 through resistor 98. By virtue of the quadrature phases provided by the condensers 76 and 82 in comparison with the resistors 74 and 80 and by virtue of the 180° out of phase relationship already mentioned, it will be evident that successive switching of the diodes occurs in a complete cycle of the switching frequency, noting that due to operation there is a normally applied negative bias of the anodes of these diodes so that they become conductive only when their cathodes are negative to a substantial degree. Thus, with the connections suitably arranged in one arbitrary position, the diode 62 may be conductive through a major portion of one quarter cycle, the diode 66 may be conductive through the major portion of the second quarter cycle, the diode 64 may be conductive through the third quarter of the cycle, and the diode 68 may be conductive through the major portion of the fourth quarter of a cycle, the switching of the diodes in this fashion into conductive condition being repeated in successive cycles. From the standpoint of effectiveness, therefore, the capacitances which appear at the leads 18, 20, 22 and 24 are correspondingly selectively switched into the circuit. When conductive, the diodes pass the signal current provided through the secondary of transformer 56. The signal current is thus selectively switched to the capacitances through the respective leads.

Figure 3:
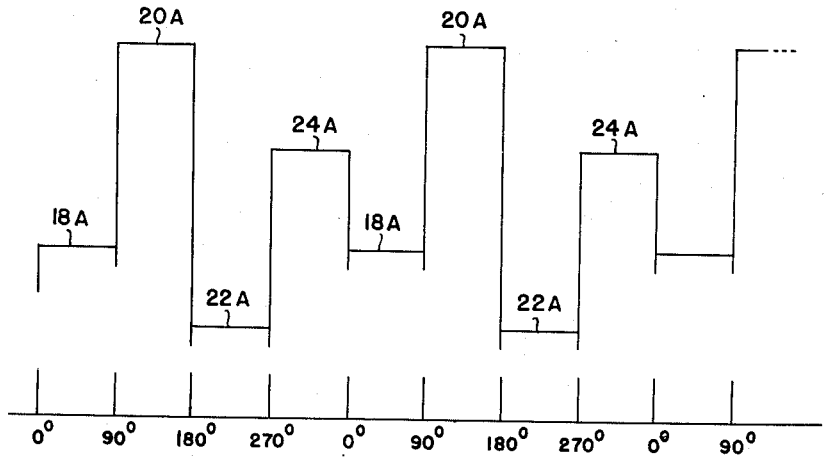
Figure 3 is a diagram explanatory of the operation and, in particular, showing a typical waveform which appears in the apparatus.

Presented, accordingly, to the input of the amplifier 106 is a signal which comprises both switching and exciting signal frequency components which are summed, there being little, and negligible, modulation involved. This combination signal is amplified in amplifier 106 which may be conventional and is desirably provided with automatic gain control through the connection 108 to which further reference will be made hereafter. The output from the amplifier is rectiled by diode 110 and applied across the parallel arrangement of resistor 112 and condenser 114. The ungrounded terminal of condenser 114 is connected through capacitor 118 to the ungrounded terminal of an output resistor 120 from which signals are provided through connection 122. The condenser 114 is arranged to bypass the exciting frequency components so that at terminal 116 there appears a direct component plus a component at switching signal frequency and harmonics thereof. The latter alternating component is delivered through capacitor 118 to connection 122. Figure 3 illustrates the waveform which appears at the terminal 116. In this figure, there are indicated the particular wave components 18A, 20A, 22A, and 24A which correspond to the switching into the circuit, as described above, of the respective lines 18, 20, 22 and 24.

The D.C. component of the signal appearing at 116 is delivered to a voltmeter 124 which may be graduated in terms of eight foot intervals as indicated to give a direct reading of the particular eight foot intervals in which indications are being made. It may be noted that as the liquid level rises the indications on this meter increase continuously since they are dependent upon the total of the capacitances which are involved throughout each cycle of the switching frequency in the circuit. This meter need not have any great accuracy since it is used only for the purpose of removing ambiguity as to the particular eight foot range undergoing measurement.

A transformer 128 has its primary 126 connected to the terminals 36 preferably in series with the primary of transformer 34 to avoid any shift in phase. The transformer 128 has a pair of secondaries 130 and 132 which, like the secondaries 70 and 72 of transformer 50, are connected to the arrangements of resistors 134 and 138 and of condensers 136 and 140 to provide outputs which are in 90° phase displacements with respect to each other to determine successive quarter cycles in the same general fashion as has been described above with reference to the apparatus illustrated in Figure 1. The terminals of the resistors and condensers just mentioned which are remote from the transformer secondaries are connected to each other and through connection 142 to the line 122. The line 122 is connected through resistor 144, diode 146 and resistor 148 to one terminal of a condenser 150, the other terminal of which is grounded. The transformer-connected end of resistor 134 is connected through resistor 152, diode 154 and resistor 156 to one terminal of a condenser 158, the other terminal of which is grounded. The anode of diode 146 is connected to the cathode of diode 154 at 160, as illustrated.

The line 122 is connected through resistor 162, diode 164 and resistor 166 to the ungrounded terminal of condenser 158. The transformer-connected end of resistor 138 is connected through resistor 168, diode 170 and resistor 172 to the ungrounded terminal of condenser 150. The anode of diode 164 is connected to the cathode of diode 170 at 174. The operation of the arrangement just described may now be considered. The transformer-connected ends of the resistors 134 and 138 have potentials which are constantly 180° out of phase with each other. Assume that the potential at the upper end of resistor 134 is positive so that the corresponding terminal of resistor 138 is negative. There may then be traced the conductive path from resistor 134 through resistor 152, diode 146, resistor 148, resistor 172, diode 170 and resistor 168 to the upper terminal of resistor 138. Diodes 146 and 170 are conductive since the potentials applied to them are in the forward direction, whereas diodes 154 and 164 are, obviously, non-conductive. Considering the ungrounded terminal of condenser 150, it will be evident that if resistors 144 and 168 are equal and resistors 148 and 172 are equal, and that the forward resistances of the diodes 146 and 170 are negligible (though, in any event, they would be approximately equal), it will be clear that the net potential resulting from the switching signal applied to the ungrounded terminal of condenser 150 is very closely zero. Accordingly, the switching potential provides no substantial contribution to the charge on this condenser. Since diode 146 is conducting due to the switching signal, there is provided a conductive path from line 122 through resistor 144, diode 146 and resistor 148 to the ungrounded terminal of condenser 150 so that this condenser under these circumstances is receiving a charge corresponding to the signal appearing at 122. At this same time, however, the diode 164 is cut off so that there is no connection between line 122 and the ungrounded terminal of condenser 158.

When the potentials at the upper terminals of resistors 134 and 138 are reversed, it will be evident that condenser 158 is connected to line 122 while condenser 150 is cut off therefrom. From the foregoing it will be evident that the difference of potentials accumulated on the condensers 150 and 158 will correspond to the difference of the capacitances presented to the lines 18 and 22 by the elements within the tank and the difference of potential will have a sign corresponding to that of the difference of these capacitances. It may be noted that no bias is applied to the diodes in the arrangement now under discussion and, consequently, each diode has a conductive period approximating 180°. While this means that the condensers 150 and 158 are connected to line 122 through some portions of periods in which the signals on line 122 correspond to the capacitances appearing at lines 20 and 24, consideration of Figure 3 will reveal that the contributions which are thus provided balance out, equal amounts being applied to both condensers, so that the difference of potentials of these condensers, which alone is of interest, is maintained constant for a given liquid level.

Connected with the upper terminals of condensers 136 and 140 and with line 122 is a circuit arrangement including diodes and resistors which is identical with that just described and, accordingly, the description need not be repeated in detail. It will suffice to point out that the arrangement provides charges to condensers 176 and 180 which are qualitatively similar to those applied to condensers 150 and 158 but correspond to the capacitances connected to lines 20 and 24, the switching taking place at a phase displacement of 90° with respect to the switching occurring in the circuitry connected to condensers 150 and 158. The difference of potential appearing between the ungrounded terminals of condensers 176 and 180 is in magnitude and sign in correspondence with the capacitance difference exhibited between lines 20 and 24 and ground.

It will be evident from the foregoing that direct potentials are accumulated by the condensers 150, 158, 176 and 180, switching signals being, for all practical purposes, completely suppressed.

The ungrounded terminals of condensers 150 and 158 are respectively connected at 182 and 184 through resistors 190 and 192 to the terminals of a chopping relay comprising an armature 194 and an operating coil 196 which may be operated at any suitable frequency, for example, that of the commercial 60 cycle supply. The frequency of chopping has no required relationship to the frequency of switching previously described since the input at this stage of the apparatus is direct. The armature 194 is connected to the input of a conventional amplifier 198 which provides its output to a terminal 200 which is connected at 202 to a second armature 204 connected to the armature 194 and shifted in synchronism therewith to connect the armature 202 alternately with contacts which are connected through lines 206 to respective sets of contacts 208 and 210 arranged to be swept by an arm 214 which is grounded at 216.

It will be noted that, as illustrated, the contacts 208 and 210 form a total of eight with the contacts 208 which are connected together arranged successively as a group with the contacts 210 which are connected together forming a separate successive group. The arrangement just described provides a synchronous rectifier the operation of which is as follows:

As previously described, the condensers 150 and 158 have accumulated positive potentials with respect to ground the difference of which potentials is of interest. The armature 194 therefore receives a chopped wave having peaks corresponding to the higher condenser potential and troughs corresponding to the lower. The resulting wave accordingly has an alternating component which is proportional in its amplitude to the difference between the condenser potentials. The amplifier 198 is capacitance coupled and, accordingly, only this alternating component is delivered at terminal 200. This terminal is grounded during each half cycle of the alternating wave which is, consequently, rectified to provide a charge on condenser 236 with an output potential at the ungrounded terminal 238 thereof. The sign of the potential thus accumulated may be positive or negative depending upon the phase of the grounding which is determined by the positions of the switch arm 214. Assume, for example, that the switch arm 214 engages a contact 208 which, as diagrammed, is connected to the upper contact engageable by armature 204. Grounding then occurs during connection of the input fo the amplifier to the condenser 150. If the condenser 150 is more positive than the condenser 158, this means that the potential appearing at 238 will be negative and proportional to the difference in potential of the condensers. On the other hand, assuming the same switch position of 214, if the potential of condenser 158 exceeded that of condenser 150, then the potential at 238 would be positive and proportional to the difference of condenser potentials. On the other hand, if switch arm 214 engaged one of the contacts 210, then the polarity of the output terminal 238 would be reversed as contrasted with those just discussed. In brief, then, the output potential at 238 is coded by means of its sign to give an indication as to whether the capacitance associated with the line 18 or with line 22 is the larger. At the same time, the magnitude of the output at terminal 238 is proportional to the difference between these capacitances. As will shortly appear, the switch 214 exerts a searching action to provide, in combination with other switches, a predetermined type of output. Upon the attainment of this type of output, the position of the switch, and associated other switches, determines the particular foot range within the eight foot interval in which the liquid level is located. The synchronous rectifying arrangement which has been described is duplicated in connection with condensers 176 and 180 which provide inputs to the chopper and rectifier arrangement 218 associated with the amplifier 220 which is similar to the amplifier 198. Terminal 222 connected to the output of this amplifier is arranged for selective grounding through connection 224 and leads 226 to the contacts 228 and 230 which are engageable by the arm 232 grounded at 234. It will be noted that the contacts 228 and 230 with respect to their association with the upper and lower synchronous rectifier contacts are shifted by two steps of the complete eight with respect to the corresponding contacts 208 and 210.

The output at terminal 242 of condenser 240 is similar to that which has been described with respect to terminal 238 but in this case the output corresponds to the conditions existing at condensers 176 and 180 and, in turn, to the cnditions existing at leads 20 and 24.

Terminal 238 is connected through line 244 to the selecting arm 248 of a third switch, the arm being arranged to engage contacts of two series 250 and 252, the contacts of each series being connected together. Similarly, terminal 242 is connected through line 246 to the switch arm 254 which is arranged to engage contacts of two series 256 and 258, the contacts of each of these series being connected together. The contacts 252 and 258 are joined by a connection 262, and the contacts 250 and 256 are joined by a connection 260. The contact arms 248, 254, 232 and 214 are mechanically connected to rotate together and in Figure 2 they are shown in phase with the contacts which they engage appropriately and correspondingly arranged. Mention has already been made of the relative displacement of the corresponding contacts engageable by arms 214 and 232. Attention may now be called to the contacts 256 and 258 which, it will be noted, occur in successive pairs and in particular relationship to the contacts engageable by the arms 214 and 232 as shown. Contacts 250 and 252 also occur in successive pairs which, from the standpoint of inner and outer connections illustrated, are staggered as compared with those engageable by arm 254. Examination of the four rotary switches illustrated will reveal that with respect to ground connections and with respect to the connections 260 and 262 there are eight distinct arrangements. These, accordingly, provide unique coding with respect to eight successive feet of level measurement and by seeking the particular position of the switch arms which gives rise to a unique output, as will be described, there is thus determinable the particular foot range in which measurements are being made out of each subrange of eight feet. As has already been noted, the particular eight foot range in which measurements are being made is determinable from the indication on the meter 124.

Connection 260 is joined through line 264 to ground through a voltmeter 266 shunted by an adjustable resistance 268 supplied for sensitivity adjustment. The meter 266 is desirably a linear meter of high accuracy capable, consistently with the results previously indicated as desirable, of reading to an accuracy of better than 1% throughout its range. It is this meter on which reading is made of fractional parts of a foot and the meter may be calibrated directly in terms of such fractions. Connection 262 is connected at 270 and through resistor 280 and line 282 to the automatic gain control connection 108 previously referred to. The line 282 is connected to ground through condenser 284. Line 270 is connected through diode 272 and resistors 274 and 276 to the line 264, the anode of diode 272 being connected to line 270. A second diode 278 is connected between ground and the cathode of diode 272, the anode of diode 278 being connected to the cathode of diode 272. A diode 286 has its anode connected to line 282 and its cathode connected to the negative terminal of a battery 288 the positive terminal of which is grounded.

A relaxation oscillator is provided at 290. This may be of simple type comprising a resistor 292 and condenser 294 connected in series between a positive potential supply terminal 296 and ground, there being shunted across the condenser 294 the series arrangement of a relay coil 300 and a neon or other suitable gaseous discharge tube 298. The armature of the relay indicated at 302 is arranged to engage a contact 304, the armature and contact being shunted across the resistor 274 to provide short circuiting thereof when the tube fires. The armature 302 is connected at 306 through a small condenser 308 to the control grid of a thyratron 310. Resistors 314 and 316 are connected between the positive supply terminal 312 and ground and have their junction connected to the cathode of the thyratron. A resistor 318 is connected to the positive supply terminal 312 and in series with an operating switch stepping coil 322 to the anode of the thyratron. A condenser 320 is connected between the negative end of resistor 318 and ground. The coil 322 is diagrammatically indicated as associated with a motive means 324 providing the mechanical connection 326 to the switch arms 214, 232, 254 and 248. This stepping arrangement may be of any well-known type and is desirably operable at a relatively high frequency to avoid delay in securing readings. To indicate the positions occupied by the switch arms their shaft is connected to a pointer 330 associated with a dial 328 carrying markings 332 indicative of feet in a range of eight feet. As previously noted, the eight positions which may be assumed by the switch arms correspond to feet in a range of eight feet.

The thyratron 310 is normally biased against firing by the arrangement of its cathode between the resistors 314 and 316. Firing occurs only when a positive pulse is applied to the control grid through condenser 308. The control of the thyratron is as follows:

Assume, first, that due to conditions in the system and the particular positions of the switches that the line 264 is positive. Under these conditions, current flows through the resistors 276 and 274 to ground through diode 278. The relaxation oscillator is caused to pulse continuously to produce rapid repeated closures of the contacts 302, 304, the pulsing being at a rate suitable for stepping the switch. If current, as just described, is flowing through resistor 274, the short circuiting of this resistance will produce a transient output on line 306 which by differentiation by condenser 308 will provide a positive pulse firing the thyratron. In this firing, the condenser 320 discharges through the coil 322 and the anode thereby providing a step of the switch. Following firing, deionization occurs, the condenser 320 recharging through the resistor 318 so that there is deenergization of coil 322 to provide a restoration of the stepping means for subsequent operation. So long, therefore, as by virtue of stepping line 264 remains positive, the stepping of the switch will continue.

Assume now that line 264 is negative but that line 270 is positive. Under these conditions, flow of current takes place in the forward direction through diode 272 and through resistors 274, 276. Again, therefore, resistor 274 carries current and the short circuiting thereof will provide a firing positive potential to the control grid of the thyratron to provide stepping.

Assume now that both lines 264 and 270 are negative but that the potential of line 264 is more negative than line 270. Under these conditions, diode 272 will again be conductive providing current flow through resistor 274. Accordingly, the short circuiting of this resistor will again provide a firing pulse to the thyratron to provide stepping. Current is prevented from flowing through resistor 274 only if both lines 264 and 270 are negative and the potential of line 270 is more negative than that of line 264. Under such conditions, the shore circuiting of resistor 274 provides no output to the thyratron and stepping of the switches is arrested. In brief, then, the stepping of the switches will continue until the switching provides the condition just mentioned which can be obtained in only one position of the switches. Due to the effective coding above described, this condition of arrest of the switches is uniquely in correspondence with a particular foot in the eight foot sub-range. The switch position indicates this particular foot on the dial 328 and when the switch reaches a position of rest the observer will know that the reading on the voltmeter 266 is valid to indicate fractions of a foot and the complete information concerning the level is obtained from the reading on meter 124 identifying the particular sub-group of eight feet, the reading on dial 328 which indicates the particular foot in the sub-group of eight feet and the reading on the meter 266 which is to be added to the foot reading thus obtained. It will be evident from the graphs A and B in Figure 1 that the pattern repeats in eight foot intervals. The meter 266 at most is required to measure the maximum capacitance difference which may occur in a one foot interval. Consequently, the accuracy to which measurement may be made is limited substantially only by the accuracy of measurement possible in a single foot interval irrespective of the total level range which is involved.

The automatic gain control arrangement involving the feedback connection 108 to the amplifier 106 provides for high accuracy of the reading on meter 266 irrespective of variations of dielectric constant of the material undergoing measurement and of drifts in the amplifier, etc. The action may be explained as follows:

It has been noted that when the stepping switch comes to rest the potentials of both lines 264 and 270 are negative with the potential of line 270 more negative than that of line 264. As will be apparent from considering the circuit under these conditions, and graphs A and B of Figure 1, the potential of line 270 then corresponds to one foot, and a correct indication of a fraction of a foot would be given by the ratio of the negative potentials of lines 264 and 270. For the potential indicated on meter 266 to correspond accurately to the fraction of a foot, the potential of line 270 should be definite and the ratio of the potentials should be preserved.

The potential of the battery 288 is so chosen that it is less than the potential of line 270 corresponding to one foot for a minimum dielectric constant of the material being measured. Under these conditions, the diode 286 is cut off and consequently a delayed volume control potential is applied through 108 to amplifier 106 so that, the volume control being highly effective in reducing the gain of the amplifier, the potential of line 270 is maintained close to the potential of battery 288. But the potential of line 264 as well as that of line 270 is derived through the amplifier, both being subject to the same gain control which remains essentially constant throughout a complete cycle due to accumulation of the biasing potential on capacitor 284. The result is that the potentials of lines 264 and 270 not only have the same ratio as at the iput of the amplifier, but the potential of line 270 has a substantially fixed value corresponding to one foot so that the potential of line 264 corresponds properly to a fraction of a foot. The last indication is independent of dielectric constant. If the dielectric constant increased, for example, both input signals to the amplifier giving rise to the respective potentials of lines 264 and 270 would increase in the same ratio. But by the action described above, they are both subject to the same gain control in the amplifier which brings the potential of line 270 to a standard value, and the potential of line 264 to that for accurate fractional foot indication. It may be noted that the volume control action also compensates for drift in the amplifier.

It may be noted that the foregoing is to obtain a direct fractional foot reading on meter 266 irrespective of change of dielectric constant or other drift in the circuit. If direct meter reading is not required, the same result could be secured without feedback if a potentiometer resistance was connected between line 270 and ground and line 264 was connected through a galvanometer to the movable contact of this potentiometer. Adjustment of the contact to a null reading of the galvanometer would then give the fraction of a foot in terms of contact position.

It will be evident that numerous variations may be made in the circuits described. Reference may be made to my prior application referred to above which shows numerous circuits particularly involving the switching of diodes for the purpose of comparing capacitances located remotely from a measuring point and in such fashion as to substantially completely eliminate disturbing effects which may be due to temperature or configuration variations in a long connecting cable. Various of said circuits may be adopted to provide the input to the measuring means. In view of the independence of the conections which is involved, a single measuring unit of the type illustrated in Figure 2 may be used for measurements of a large number of remotely located detecting or pickup devices, and, if desired, a switch such as 40 may be cyclically stepped for the cyclical and repeated readings of levels, for example, in a large number of tanks, provisions being made for the automatic recording of the readings of meters 124 and 266 and of the positions of the switches, the readings being controlled so as to be recorded only when stepping is arrested. The particular circuits and coding arrangements may also be varied as will be evident to those skilled in the art. While automatic control of the decoding switches has been described, it is evident that simplification may be provided, if desired, by eliminating automatic stepping, an observer in such case manipulating the bank of switches to secure relationships such as the one described corresponding to the obtaining of a valid reading on a meter such as 266. The various relative potentials may, in such case, be indicated by meters.

A null system may, of course, be provided in which the output described as applied to voltmeter 266 is balanced out in a null system of the type described in my prior application.

It will now also be evident that measurements may be made of many other variables than level. As indicated heretofore, the measurements may be of pressure and of mechanical movements or of any other variables which may by suitable transducers be translated into a pattern of variations of capacitances similar to that involved in the described measurements of levels. In many such cases, arrangements of movable condenser plates may be utilized. In any such systems, the advantages of the invention will be obtained in that accuracies may be secured corresponding to those of a limited range of capacitance measurement irrespective of the entire range of variation of the variable involved.

Figure 4:
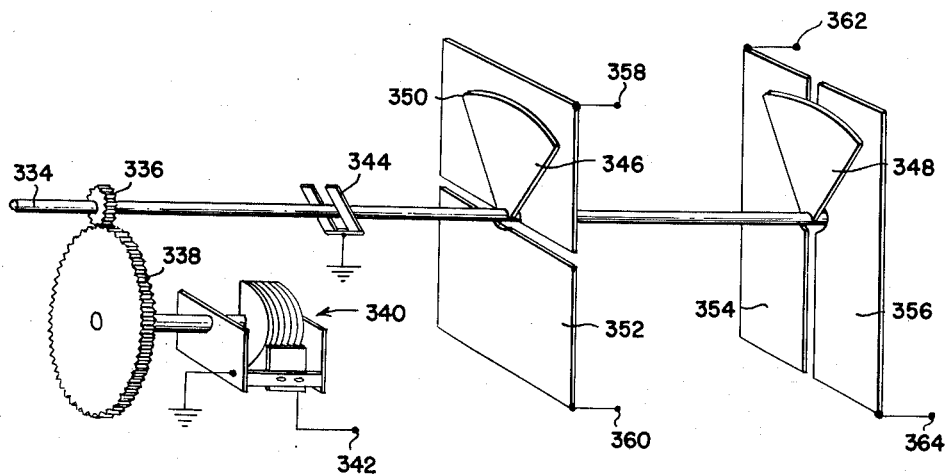
Figure 4 is a perspective diagram showing application of the invention to measurement of angular position of a shaft.

Figure 4 illustrates an apparatus of the type just indicated in which movable condenser plates are arranged to secure accurate indications of shaft rotation over a quite large range.

As diagrammed in Figure 4, a shaft 334 is provided with a pinion 336 which drives a much larger gear 338 connected to a variable condenser 340. The capacitance of this condenser measured between ground and a terminal 342 will give a relatively inaccurate measurement of the rotation of shaft 334 but, nevertheless, a measurement sufficiently accurate to give an indication of complete revolutions of the shaft 334. The output thus indicated corresponds, essentially, to the indications on the meter indicated at 124 in Figure 2. For the accurate determination of fractions of a revolution of shaft 334 it is grounded as indicated at 344 by a brush arrangement and carries in electrically conductive arrangement a pair of condenser plates 346 and 348 which angularly subtend 90°. The plate 346 provides capacitance with fixed condenser plates 350 and 352, and the plate 348 provides capacitances with fixed condenser plates 354 and 356. If the movable plates 346 and 348 have the same angular position on shaft 334, the division lines between the respective pairs of plates 350, 352 and 354, 356 would be at right angles as illustrated. It will be evident without further description that outputs taken from the terminals 358, 360, 362 and 364 from the respective fixed plates will provide a pattern of capacitances corresponding to those presented at lines 18, 20, 22 and 24 in Figure 1 with the exception, however, that the capacitances will not be cumulative. However, the capacitance differences will provide patterns such as indicated at A and B in Figure 1 and by connection of the terminals just mentioned to apparatus in the same fashion as lines 18, 20, 22 and 24, the remaining apparatus of Figures 1 and 2 may be utilized to give indication to a high degree of accuracy of the angular position of the shaft 334. Thus, to a degree of accuracy corresponding to that attainable in the matter of a single revoluation of the shaft, there may be accurately indicated a very large number of revolutions with the fractions thereof. The rotation of the shaft 334 may, of course, be responsive to any of a very large variety of variables to be measured. For example, the shaft may be driven by a float to indicate variations in liquid level, or may be responsive to the variations of a Bourdon pressure gauge, or may be responsive to a wide range of temperature changes, or the like. It will thus be evident that the invention is of quite broad applicability to the measurement of large ranges of variation of many variable quantities.

While the description has been particularly with respect to capacitances, it will be evident that the invention is equally applicable to the measurements of other impedances as described, in particular, in said prior application.

What is claimed is:

1. Apparatus for the measurement of a variable quantity comprising means providing a plurality of impedances, means responsive to said variable quantity for effecting sequential differential variations of said impedances with cyclical repetition of said sequence of variations as said variable quantity varies monotonically, means connected to said impedances and providing a plurality of outputs corresponding to differences of values of pairs of said impedances, and means responsive to said outputs to indicate both their relative relationships and the value of one of said outputs.

2. Apparatus according to claim 1 in which said means responsive to said variable quantity effects individual variations of said impedances.

3. Apparatus according to claim 1 in which said means providing outputs provides outputs varying periodically between maximum and minimum values.

4. Apparatus according to claim 1 in which said means providing outputs provides two of said outputs, each of which outputs varies between maximum and minimum values and has stationary values at said maximum and minimum values during said monotonic variation of said variable quantity, with each of said outputs varying only during the stationary values of the other.

5. Apparatus according to claim 1 in which the means responsive to said outputs comprises stepping switching means providing a predetermined output upon attainment of a significant switching relationship.

6. Apparatus according to claim 2 in which the means responsive to said outputs comprises stepping switching means providing a predetermined output upon attainment of a significant switching relationship.

7. Apparatus according to claim 3 in which the means responsive to said outputs comprises stepping switching means providing a predetermined output upon attainment of a significant switching relationship.

8. Apparatus according to claim 4 in which the means responsive to said outputs comprises stepping switching means providing a predetermined output upon attainment of a significant switching relationship.

9. Apparatus according to claim 1 in which the variable quantity is a liquid or other bed level and in which said means providing a plurality of impedances includes an assembly of elements arranged to be successively immersed by the level during monotonic variations of said level to provide variable capacitances.

10. Apparatus according to claim 9 in which groups of said elements separated by others of said elements are interconnected to provide said impedances.

11. Apparatus according to claim 1 in which said means providing a plurality of outputs is connected to said impedances through switching means periodically and successively effecting connection thereof to said impedances.

12. Apparatus according to claim 1 provided with means for amplifying one of said outputs substantially to a predetermined value and for correspondingly amplifying another of said outputs.

References Cited in the file of this patent

UNITED STATES PATENTS

| 1,124,055 | Moorefield | Jan. 5, 1915 |
| 1,504,978 | Robbins | Aug. 12, 1924 |
| 2,230,137 | Ewertz | Jan. 28, 1941 |
| 2,233,297 | Polen | Feb. 25, 1941 |
| 2,289,202 | McCoy | July 7, 1942 |
| 2,428,898 | Waymouth | Oct. 14, 1947 |
| 2,456,499 | Fritzinger | Dec. 14, 1948 |
| 2,505,072 | Sunstein | Apr. 25, 1950 |
| 2,544,012 | Edelman | Mar. 6, 1951 |
| 2,589,714 | Lee | Mar. 18, 1952 |
| 2,735,301 | Schwob | Feb. 21, 1956 |

FOREIGN PATENTS

| 200,133 | Germany | July 9, 1908 |